US012288331B2

(12) United States Patent
Ezrielev et al.

(10) Patent No.: US 12,288,331 B2
(45) Date of Patent: Apr. 29, 2025

(54) SYSTEM AND METHOD FOR PROCEDURAL RECONSTRUCTION OF SYNTHESIZED IMAGES

(71) Applicant: Dell Products L.P., Round Rock, TX (US)

(72) Inventors: Ofir Ezrielev, Be'er Sheva (IL); Amihai Savir, Newton, MA (US); Avitan Gefen, Lehavim (IL); Nicole Reineke, Northborough, MA (US)

(73) Assignee: Dell Products L.P., Round Rock, TX (US)

( * ) Notice: Subject to any disclaimer, the term of this patent is extended or adjusted under 35 U.S.C. 154(b) by 466 days.

(21) Appl. No.: 17/872,897

(22) Filed: Jul. 25, 2022

(65) Prior Publication Data
US 2024/0029241 A1    Jan. 25, 2024

(51) Int. Cl.
G06T 7/00       (2017.01)
G06T 5/50       (2006.01)
G06V 10/25      (2022.01)

(52) U.S. Cl.
CPC .............. *G06T 7/0012* (2013.01); *G06T 5/50* (2013.01); *G06V 10/25* (2022.01); *G06T 2207/20081* (2013.01); *G06T 2207/20084* (2013.01)

(58) Field of Classification Search
CPC ................ G06T 19/006; G06T 7/11; G06T 2207/20084; G06T 7/194;
(Continued)

(56) References Cited
U.S. PATENT DOCUMENTS
6,246,804 B1    6/2001  Sato et al.
8,576,238 B1    11/2013 Brandt
(Continued)

FOREIGN PATENT DOCUMENTS
WO    2008/012717 A2    1/2008
WO    2010051037 A1    5/2010
(Continued)

OTHER PUBLICATIONS

Shen, Tianyu, et al. "Mass image synthesis in mammogram with contextual information based on GANs." Computer Methods and Programs in Biomedicine 202 (2021): 106019.*
(Continued)

*Primary Examiner* — Li Liu
(74) *Attorney, Agent, or Firm* — WOMBLE BOND DICKINSON (US) LLP

(57) ABSTRACT

Methods and systems for obtaining synthesized images are disclosed. To obtain synthesized images, an imaging system may obtain areas of interest associated with an image. The areas of interest may be keyed to various processes and/or services. A downstream consumer of the services may retrieve the areas of interest to perform further analysis. In order to more easily interpret the areas of interest, the areas of interest may be displayed to the downstream consumer as part of a synthesized image. The synthesized image may include the areas of interest and a synthesized environment. The synthesized environment may be intended to emulate an environment in which the downstream consumer may expect to find the areas of interest. By doing so, the downstream consumer may be able to understand and contextualize the areas of interest more easily than if viewing the areas of interest alone.

20 Claims, 11 Drawing Sheets

(58) Field of Classification Search
CPC . G06T 2207/20081; G06T 2207/20221; G06T 5/00; G06V 10/25; G06V 10/82; G06V 10/22; G06V 10/26; G06N 3/08; H04N 23/611; H04N 5/272
See application file for complete search history.

(56) References Cited

U.S. PATENT DOCUMENTS

| | | | |
|---|---|---|---|
| 8,862,741 | B1 | 10/2014 | Tegtmeier |
| 8,873,836 | B1 | 10/2014 | Dietrich |
| 8,935,474 | B1 | 1/2015 | Todd |
| 9,665,799 | B1 | 5/2017 | Munteanu |
| 10,109,051 | B1 | 10/2018 | Natesh et al. |
| 2001/0030667 | A1 | 10/2001 | Kelts |
| 2004/0117358 | A1 | 6/2004 | Von Kaenel |
| 2006/0112334 | A1 | 5/2006 | Endrikhovski |
| 2007/0064981 | A1 | 3/2007 | Meijer |
| 2008/0184068 | A1 | 7/2008 | Mogi |
| 2008/0242968 | A1 | 10/2008 | Claus |
| 2009/0074275 | A1 | 3/2009 | O Ruanaidh |
| 2009/0210427 | A1 | 8/2009 | Eidler |
| 2011/0110568 | A1 | 5/2011 | Vesper |
| 2013/0162664 | A1 | 6/2013 | Peacock |
| 2013/0185331 | A1* | 7/2013 | Conemac ............... G06F 16/27 707/783 |
| 2014/0002466 | A1 | 1/2014 | Paragios |
| 2015/0073909 | A1 | 3/2015 | Peden |
| 2015/0134661 | A1 | 5/2015 | Circlaeys |
| 2015/0278249 | A1 | 10/2015 | Akiyama et al. |
| 2015/0332111 | A1 | 11/2015 | Kisilev |
| 2016/0062689 | A1 | 3/2016 | Cherubini |
| 2019/0011703 | A1* | 1/2019 | Robaina ................ A61B 90/36 |
| 2020/0092571 | A1 | 3/2020 | Tourapis |
| 2020/0234451 | A1* | 7/2020 | Holzer .................... G06T 7/194 |
| 2020/0285880 | A1 | 9/2020 | Sedai |
| 2020/0372718 | A1 | 11/2020 | Molyneaux |
| 2020/0411164 | A1 | 12/2020 | Donner |
| 2021/0073449 | A1 | 3/2021 | Segev |
| 2021/0150682 | A1* | 5/2021 | Sytnik ................... G06T 19/006 |
| 2021/0209488 | A1 | 7/2021 | Li |
| 2021/0233213 | A1* | 7/2021 | Mejjati ................. G06N 3/045 |
| 2021/0383242 | A1* | 12/2021 | Ostyakov ................ G06T 7/11 |
| 2022/0076411 | A1 | 3/2022 | Georgescu |
| 2022/0116549 | A1* | 4/2022 | Neofytou .............. H04N 19/30 |
| 2022/0253807 | A1* | 8/2022 | Woodard ............ G06Q 10/103 |
| 2022/0284118 | A1 | 9/2022 | Kaul |
| 2023/0206447 | A1 | 6/2023 | Kobayashi et al. |

FOREIGN PATENT DOCUMENTS

| | | |
|---|---|---|
| WO | 2015015341 A1 | 2/2015 |
| WO | 2022/064409 A1 | 3/2022 |

OTHER PUBLICATIONS

Lena Oden, "Comparing Data Staging Techniques for Large Scale Brain Images", IEEE Transactions on Emerging Topics in Computing, Dec. 6, 2021, 12 pages (Year: 2021).

Goodfellow, Ian J., et al. "Generative Adversarial Nets", Departement d'informatique et de recherche operationnelle, Universite de Montreal, Montreal, QC H3C 3J7, Canada. arXiv:1406.2661v1 [stat.ML] Jun. 10, 2014. 9 pages.

Radford, Alec, et al. "Unsupervised Representation Learning with Deep Convolutional Generative Adversarial Networks", indico Research, Boston, MA. Under review as a conference paper at ICLR 2016. arXiv:1511.06434v2 [cs.LG] Jan. 7, 2016. 16 pages.

Goodfellow, Ian, "NIPS 2016 Tutorial: Generative Adversarial Networks", OpenAI. arXiv:1701.00160v4 [cs.LG] Apr. 3, 2017. 57 pages.

Allwardt, Vanessa, et al. "Translational Roadmap for the Organs-on-a-Chip Industry toward Broad Adoption", Bioengineering 2020, 7, 112; Sep. 16, 2020. 27 pages.

Kilic, Tugba, et al. "Organs-on-chip monitoring: sensors and other strategies", Microphysiological Systems, 2018; 2:5; Sep. 5, 2018. 32 pages.

"Causal Discovery from Spatio-Temporal Data with Applications to Climate Science", Ebert-Uphoff, Imme, School of Electrical and Computer Engineering, Colorado State University, Fort Collins, CO; and Deng, Yi, School of Earth and Atmospheric Sciences, Georgia Institute of Technology, Atlanta, GA. Dec. 2014. 8 pages.

ZEN Microscopy Software, "Your Complete Solution from Sample to Knowledge", Zeiss; Carl Zeiss Microscopy GmbH, 07745 Jena, Germany. Jul. 2021. 28 pages.

ZEN Data Storage and Data Explorer, "Smart data management in life sciences", Zeiss; updated: Oct. 2020; Carl Zeiss Microscopy GmbH, 07745 Jena, Germany; Oct. 2020. 4 pages.

Torfi, Amirsina, et al. "Differentially Private Synthetic Medical Data Generation using Convolutional GANs", ARXIV Submission Version. arXiv:2012.11774v1 [cs.LG] Dec. 22, 2020. 13 pages.

Raghunath et al., "Mouse cursor movement and eye tracking data as an indicator of pathologists' attention when reviewing digital whole slide images", 2012, J Pathol Inform 2012;3:43 (Year: 2012) (8 pages).

\* cited by examiner

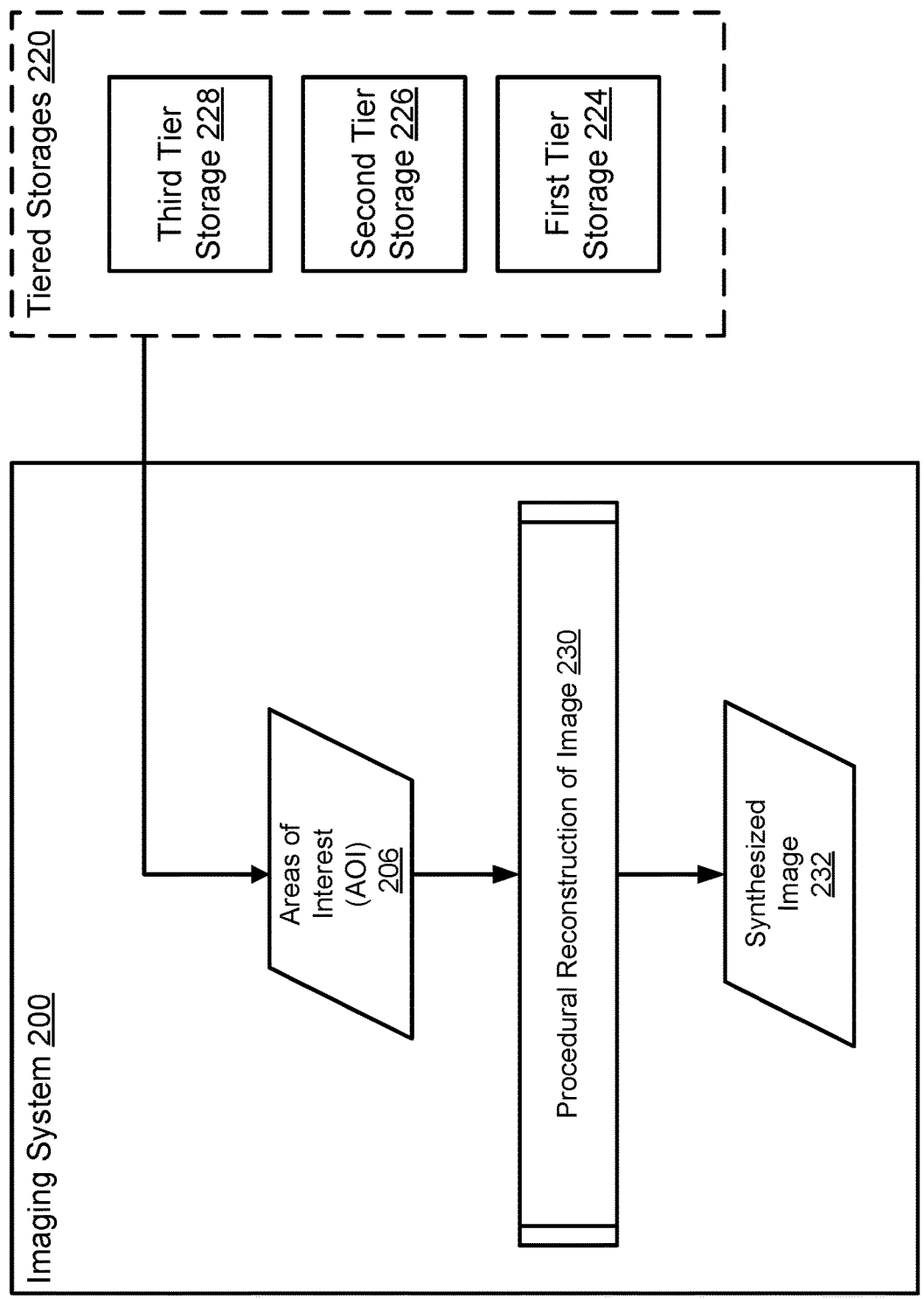

SYSTEM AND METHOD FOR PROCEDURAL RECONSTRUCTION OF SYNTHESIZED IMAGES

FIELD

Embodiments disclosed herein relate generally to image generation. More particularly, embodiments disclosed herein relate to systems and methods to manage the generation of synthesized images.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2B shows a block diagram illustrating a procedural reconstruction process over time in accordance with an embodiment.

DETAILED DESCRIPTION

Figure 1:
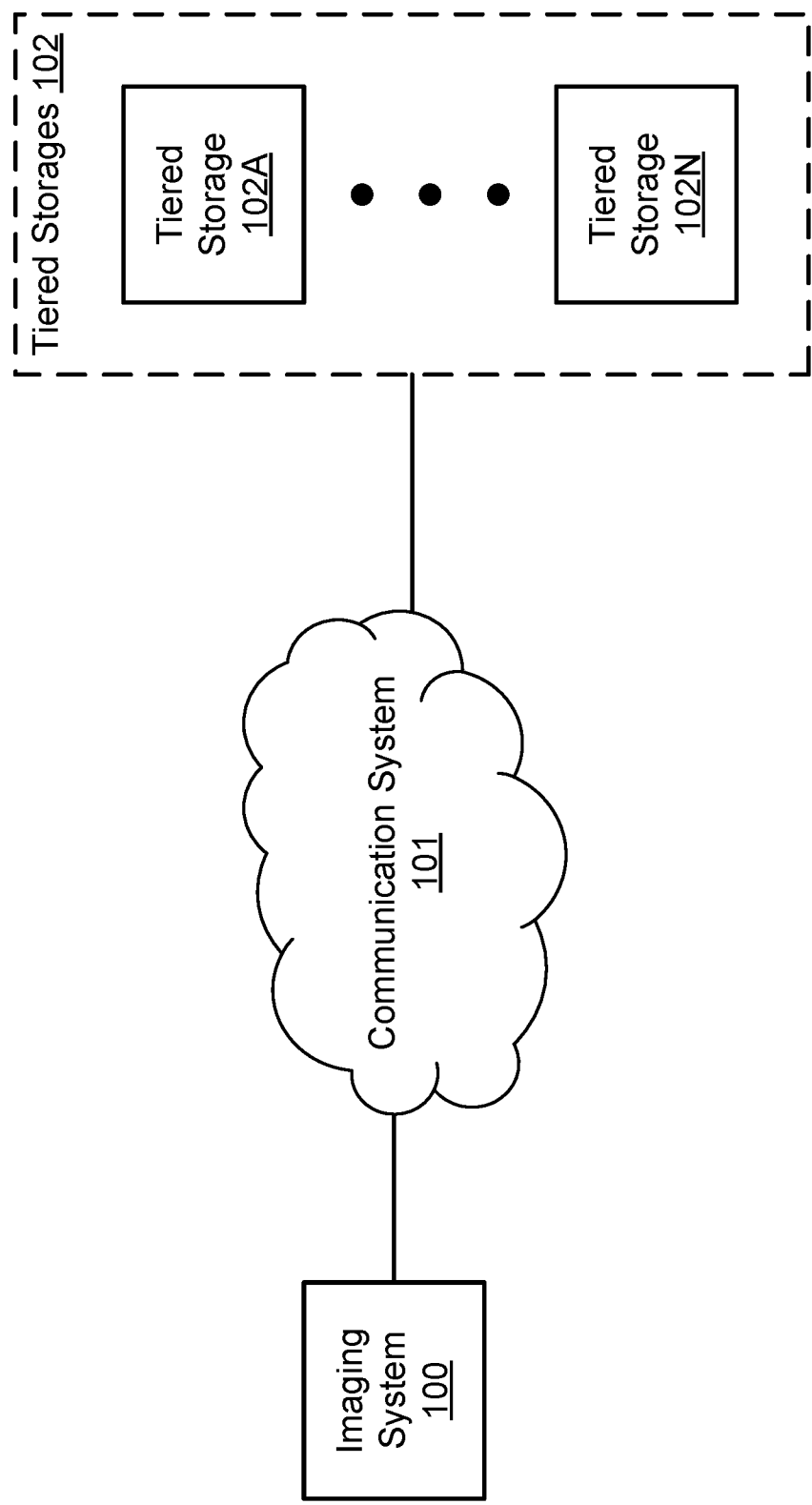
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for generating synthesized images. To generate synthesized images, the system may include an imaging system. The imaging system may host an inference model trained to identify one or more areas of interest and generate inferences based on the areas of interest in an image. Various processes and/or services may be keyed to the areas of interest and the areas of interest may be provided to a viewer (e.g., a downstream consumer) in order to facilitate further analysis and/or interpretation of the areas of interest. However, displaying only the areas of interest to the viewer and not the entirety of the image may limit the viewer's ability to interpret the areas of interest due to the lack of contextual information (e.g., from the full image).

To display the areas of interest to a viewer in a way that provides contextual information (or at least in a manner that does not distract from the information included in the areas of interest), a trained inference model may generate a synthesized image using the areas of interest and a synthesized environment (e.g., a simulation of the portions of the image not included in the areas of interest). The areas of interest may indicate a portion of a scene depicted by the image. For example, some of the image may include important information relevant to a diagnosis or identification of another condition while other portions of the image may include little or no relevant information. Therefore, the areas of interest may include the portions of the image including important information relevant to a diagnosis or identification of another condition.

The synthesized environment may include a simulated environment in which the areas of interest may naturally reside from the perspective of the downstream consumer. The synthesized image may depict the areas of interest superimposed on (or otherwise included in) the synthesized environment. In order to obtain the synthesized environment, a procedural reconstruction process may be performed using the areas of interest. The procedural reconstruction process may utilize a neural network inference model trained to ingest the areas of interest or other type of construction entity, and obtain the synthesized environment as output.

By doing so, embodiments disclosed herein may provide a system for generating synthesized images in which areas of interest may be presented to a downstream consumer in a common environment (e.g., an environment in which the areas of interest may naturally reside from the perspective of the downstream consumer). By displaying the areas of interest in the common environment (e.g., via the synthesized image) a viewer may interpret the areas of interest of the image without distraction due to the limited extent of the areas of interest compared to the extent of the image, while also reducing the computing resources expended for displaying the areas of interest. For example, by only reading image segments corresponding to the areas of interest, the total quantity of data read from storage may be reduced.

In an embodiment, a method for managing generation of synthesized images is provided. The method may include obtaining an area of interest associated with an image, the area of interest indicating a portion of a scene depicted by the image being relevant to a process performed by a downstream consumer, and the portion of the scene being one of multiple portions of the scene depicted by the image; obtaining a synthesized environment in which the portion of the scene naturally resides from a perspective of the downstream consumer, the synthesized environment depicting a type of scene similar to a type of the scene depicted by other portions of the multiple portions of the scene depicted by the image; obtaining a synthesized image of the synthesized images using the area of interest and the synthesized environment, the synthesized image depicting the area of interest in the synthesized environment to facilitate presentation of the area of interest in a common environment in which the area of interest would be expected to be found by the downstream consumer; and providing the synthesized image to the downstream consumer.

Obtaining the synthesized environment may include: performing a procedural reconstruction process to obtain the synthesized environment using the area of interest, the synthesized environment comprising a second image about the area of interest.

Portions of the area of interest adjacent to the second image about the area of interest are matched to disguise a boundary between the area of interest and the second image.

Performing the procedural reconstruction process may include: ingesting the area of interest into a trained inference model to obtain the second image as output from the trained inference model.

Performing the procedural reconstruction process may also include: ingesting at least a second area of the image into the trained inference model to obtain the output.

The trained inference model may be a trained neural network.

The portion of the scene may be relevant to a medical diagnosis through interpretation of the image, and the other portions of the multiple portions of the scene may be irrelevant to the medical diagnosis made using the image.

The synthesized image may present the area of interest to a subsequent interpreter of the synthesized image in the common environment to facilitate interpretation by the subsequent interpreter without distraction due to a limited extent of the area of interest compared to an extent of the image.

Obtaining the area of interest may include: obtaining image segments, at least one of image segments including a portion of the area of interest and a portion of the image outside the area of interest; and isolating the portion of the area of interest from the portion of the image outside the area of interest to obtain a portion of the area of interest.

The method may also include discarding the portion of the image outside the areas of interest.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize images as part of the provided computer-implemented services.

The images may include, for example, super resolution images or other types of images of large size (and/or other sizes). The images may depict various types of scenes which may be useful for a range of purposes. For example, the images may depict scenes useful for medical diagnosis, accident analysis, surveying, and/or other types of purposes.

The computer-implemented services may include any type and quantity of computer-implemented services. The computer-implemented services may include, for example, (i) analysis services through which the images may be analyzed and information derived from the images may be obtained, (ii) data storage services for storing and providing copies of the images over time, and/or (iii) any other type of computer-implemented services that may be performed, at least in part, using images (e.g., image files).

To facilitate the use of images as part of the computer-implemented services, areas of interest associated with an image may be obtained. The areas of interest may include portions of the image most relevant to a process or service performed as part of the computer-implemented services. Although the areas of interest may include the most relevant information from an image, providing only the areas of interest to the downstream consumer may impede interpretation of the image due to the lack of contextual information (e.g., other portions of the image) surrounding the areas of interest.

For example, a subject matter expert (SME) may be a medical professional and an inference model may be trained to generate a medical diagnosis based on areas of interest in a tissue biopsy image. The system may provide the SME with the inferences and the areas of interest. The SME may choose to re-evaluate the diagnosis by reviewing the areas of interest. However, viewing only the areas of interest (rather than the full image) may distract the SME from understanding and contextualizing the diagnosis obtained by the inference model.

In general, embodiments disclosed herein may provide methods, systems, and/or devices for obtaining synthesized images to facilitate the performance of desired computer-implemented services. To manage obtaining synthesized images, the system of FIG. 1 may include imaging system 100. Imaging system 100 may (i) obtain an area of interest, (ii) obtain a synthesized environment, (iii) obtain a synthesized image using the area of interest and the synthesized environment, and (iv) provide the synthesized image to a downstream consumer. By doing so, embodiments disclosed herein may provide a more familiar representation of the area of interest to the downstream consumer and, therefore, facilitate interpretation of the area of interest by the downstream consumer.

In order to obtain an area of interest, imaging system 100 may obtain image segments from an image. At least one of the image segments may include a portion of the area of interest and a portion of the image outside the area of interest. Imaging system 100 may isolate the portion of the area of interest from the portion of the image outside the area of interest to obtain a portion of the area of interest. Imaging system 100 may discard the portion of the image outside the area of interest. Therefore, the area of interest may be obtained by collecting the portions of the image segments including portions of the area of interest.

The area of interest may be stored in high-performance storage in order to facilitate easy retrieval of the area of interest. In addition, the high-performance storage may allow the area of interest to be stored at a higher level of resolution than lower-performance storage. Portions of the image not included in the area of interest may be stored in lower-performance storage and may not be easily retrievable for use by a downstream consumer. As previously mentioned, viewing only the area of interest may distract a SME from understanding and contextualizing the area of interest. Therefore, in order to offer a familiar context in which to view the area of interest without retrieving the entire image from lower-performance storage, an inference model may generate a synthesized environment as described below.

The synthesized environment may depict a scene similar to the scene depicted by the image associated with the area of interest. In order to obtain the synthesized environment, imaging system 100 may perform a procedural reconstruction process using the areas of interest. The synthesized environment may include a second image about the area of interest. The portions of the area of interest adjacent to the second image may be matched to disguise a boundary between the area of interest and the second image. In order to perform the procedural reconstruction, a trained inference model may ingest the area of interest and obtain the second image as output. The trained inference model may be a trained neural network. In some cases, a second area of the image may also be ingested by the trained inference model to obtain the output.

In order to obtain the synthesized image, the area of interest may be placed in the synthesized environment. By doing so, imaging system 100 may facilitate interpretation of the area of interest by a subsequent interpreter (e.g., a SME or another inference model) without distraction due to the limited extent of the area of interest compared to the extent of the image.

Continuing with the above example, an area of interest in an image may be relevant to a medical diagnosis. A medical professional (e.g., a SME) may evaluate the diagnosis by viewing the area of interest. However, the medical professional may have difficulty interpreting the area of interest without the context of viewing the entire image.

In order to facilitate interpretation of the area of interest by the medical professional, an inference model may take the area of interest (and/or other areas of the image) as input and generate a synthesized environment as output. The synthesized environment may depict a common environment in which the medical professional may expect to view the area of interest. The area of interest may be placed within the synthesized environment to generate a synthesized image. The synthesized image may be presented to the medical professional for review.

While described with respect to medical diagnosis, it will be appreciated that the area of interest may be used to achieve other types of goals.

One or more areas of interest may be provided to a downstream consumer of the inferences. In an embodiment, the computer-implemented services may include storing the areas of interest in storage tiers of varying performance levels. In order to manage the storage of areas of interest, (i) the image may be segmented, (ii) the image segments may be classified based on the areas of interest, (iii) the image segment may be allocated for different storage tiers depending on the likelihood of future access of each image segment, and (iv) the image segments may be stored in storages of varying storage tiers based on the allocation for each respective image segment so that image segments that are more likely to be accessed in the future are stored in higher performance storage tiers and image segments that are less likely to be accessed in the future are stored in lower performance storage tiers. By doing so, embodiments disclosed herein may provide a more responsive system by improving the efficiency of resource allocation for accessing images while limiting cost incurred for responsiveness of the system.

For example, if an image segment includes a portion of the image that is within an area of interest, the image segment may be treated as having a high likelihood (or another level of likelihood depending on the level of area of interest in a hierarchy) of being accessed in the future. In another example, if an image segment is not within any areas of interest, the image segment may be treated as having a low likelihood of being accessed in the future. In a still further example, if an image segment is partially within an area of interest (e.g., straddles a boundary of an area of interest), then the image segment may be treated as having a medium likelihood of being accessed in the future. Other criteria may be used to ascertain the level of likelihood of an image segment being accessed in the future may be used without departing from embodiments disclosed herein.

Tiered storages 102 may store image segments and/or other data structures. Tiered storages 102 may include any number of tiered storages (e.g., 102A, 102N). Different tiered storages may provide different quality levels with respect to storing data and/or providing copies of stored data. For example, different tiered storages may be implemented with different types and/or quantities of hardware devices. Consequently, different storage tiers may be more or less costly to implement depending on hardware/software components used to implement the storage tiers. To manage cost, tiered storages 102 may include tiered storages with different levels of performance and associated cost. Accordingly, imaging system 100 may store image segments that are more likely to be accessed in the future in higher performance storage tiers (which may have higher associated costs) and other image segments that are less likely to be accessed in the future in lower performance storage tiers.

In an embodiment, tiered storages 102 is implemented with a range of different storage tiers providing different levels of performance having corresponding levels of associated cost. Thus, the image segments may be distributed to the different storage tiers based on corresponding likelihoods of future access.

In an embodiment, tiered storages 102 is implemented with two storage tiers that provide different levels of performance having corresponding levels of associated cost. The image segments associated with areas of interest may be stored in a higher performance tiered storage and the image segments not associated with areas of interest may be stored in lower performance tiered storage.

When performing its functionality, one or more of imaging system 100 and tiered storages 102 may perform all, or a portion, of the methods and/or actions shown in FIGS. 3A-4F.

Any of imaging system 100 and tiered storages 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with a communication system 101.

In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, communication system 101 is implemented with one or more local communications links (e.g., a bus interconnecting a processor of imaging system 100 and any of the tiered storages).

While illustrated in FIG. 1 as included a limited number of specific components, a system in accordance with an embodiment may include fewer, additional, and/or different components than those illustrated therein.

Figure 2A:
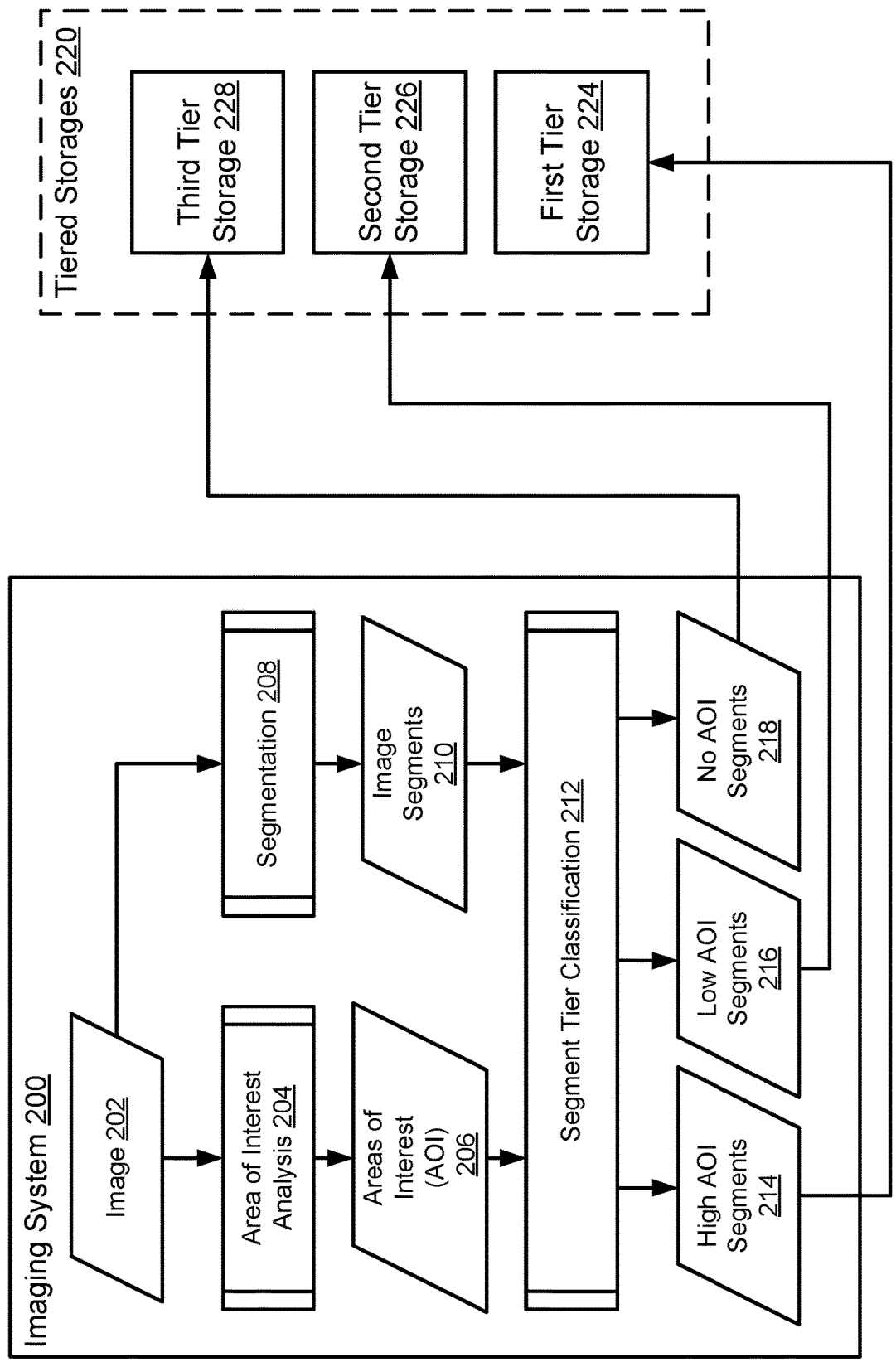
FIG. 2A shows a block diagram illustrating an imaging system and multiple tiered storages over time in accordance with an embodiment.

Turning to FIG. 2A, a data flow diagram in a system similar to that illustrated in FIG. 1 in accordance with an embodiment is shown. Imaging system 200 may be similar to imaging system 100, and tiered storages 220 may be similar to tiered storage 102.

Imaging system 200 may obtain image 202. Image 202 may be a data structure including information regarding a scene. For example, image 202 may be any type of image file. The image file may include lossy or lossless compression, may be of any family type (e.g., raster, vector, etc.) or a hybrid, and may include any quantity of information regarding a scene. The image file may be of any format (e.g., Joint Photographic Experts Group (JPEG), Tagged Image File Format (TIFF), Portable Network Graphics (PNG), Graphics Interchange Format (GIF), a three-dimensional (3D) image, etc.). Image 202 may be obtained by receiving it from another device (e.g., an imaging device such as a camera), reading it from storage, or by generating it using an imaging device.

Imaging system 200 may perform an area of interest analysis 204 and/or segmentation 208 of image 202. These operations may generate data structures used to select storage location(s) for image 202, and/or store image 202.

Area of interest analysis 204 may identify one or more areas of interest 206 in image 202. Areas of interest 206 may correspond to regions (e.g., groups of pixels (or voxels) corresponding to portions of the depicted scene) of image 202. Each of the areas of interest may also be associated with a type reflecting a place within a hierarchy of the areas of interest. In this manner, areas of interest of greater and/or lesser importance may be defined by the type of each of the areas of interest. Area of interest of similar importance may be of the same type.

Segmentation 208 may segment image 202 into any number of image segments 210. Image 202 may be segmented using any method (e.g., dividing into a number of portions with approximately the same quantity of information for different portions of the depicted scene) without departing from embodiments disclosed herein. The boundaries of each of image segments 210 may or may not conform to the boundaries of area of interest 206.

Once obtained, image segments 210 may be subject to segment tier classification 212 processing based on areas of interest 206 corresponding to the image segments 210. Segment tier classification 212 may classify image segments 210 based on the corresponding areas of interest 206, and allocate the classified image segments for storage in different storage tiers based on the classification of each image segment.

For example, all image segments associated with areas of interest that are of a high level of importance may be classified as high area of interest segments 214. Similarly, all image segments associated with areas of interest that are of a low level of importance may be classified as low area of interest segments 216. In contrast, all image segments that are not associated with any areas of interest may be classified as no area of interest segments 218. These classifications may be used to perform lookups (or other processes) to identify storage tiers for storage of the corresponding image segments. Once identified, the image segments may be allocated for and stored in storages corresponding to the identified storage tiers.

As seen in FIG. 2A, all of the image segments classified as high area of interest segments 214 may be stored in first tier storage 224, which may be a high performance but costly storage (e.g., a solid state disk). The image segments classified as low area of interest segments 216 may be stored in second tier storage 226, which may be a moderate performance storage (e.g., a hard disk drive) and of moderate cost. In contrast, all of the image segments classified as no area of interest segments 218 may be stored in third tier storage 228, which may be a low performance but low cost storage (e.g., a tape drive).

By storing the image segments in this manner, the usability of the storage image may be improved while limiting cost for storing the image for subsequent use. For example, if access to the image is required in the future, the segments of the image corresponding to the portion of the scene most likely to be displayed may be stored in higher performance storage thereby facilitate rapid reading of the segments into memory to facilitate display of this portion of the scene on a display and/or subsequent use. In contrast, the image segments of the image corresponding to the portion of the scene that is unlikely to be displayed may be stored in lower performance but cost effective storage to reduce aggregate cost for storing image 202 for subsequent use.

Turning to FIG. 2B, a procedural reconstruction process is shown as performed by imaging system 200 in order to obtain synthesized image 232. As described above, areas of interest 206 may correspond to regions (e.g., groups of pixels corresponding to portions of the depicted scene) of image 202. Areas of interest 206 may be retrieved from any storage tier within tiered storage 220 (e.g., first tier storage 224, second tier storage 226, and/or third tier storage 228).

Figure 3A:
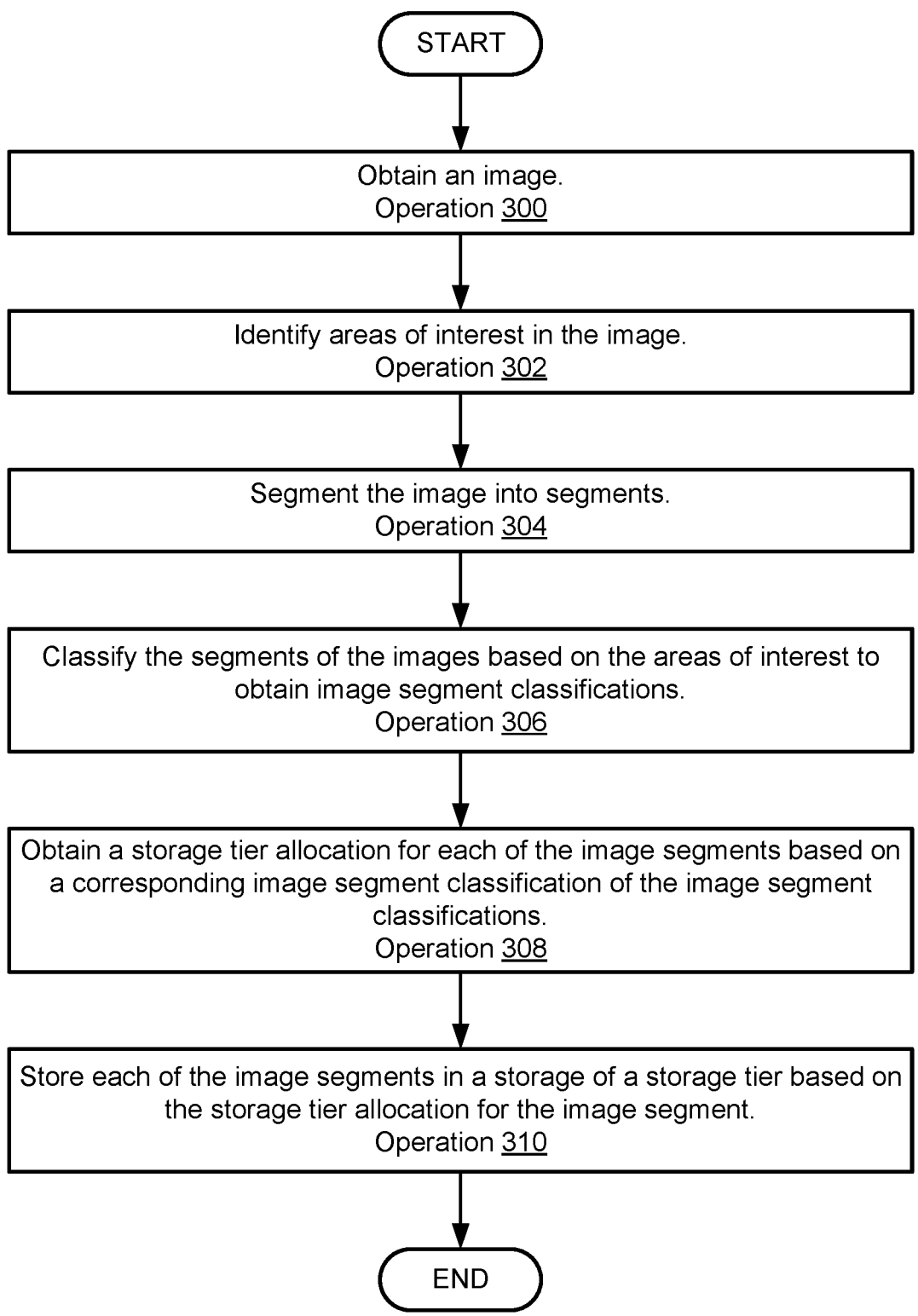
FIG. 3A shows a flow diagram illustrating a method of storing an image in accordance with an embodiment.
Figure 3B:
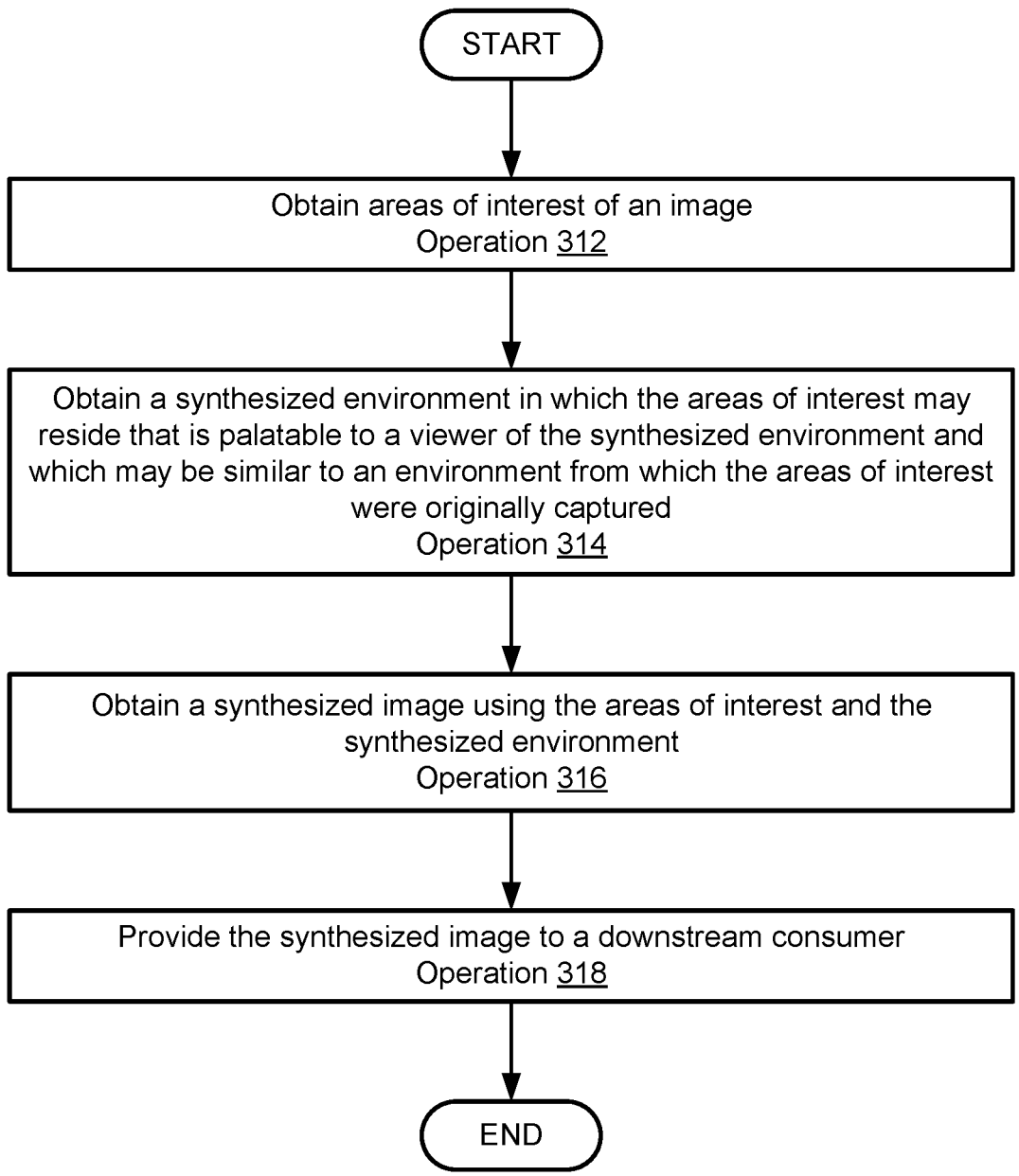
FIG. 3B shows a flow diagram illustrating a method of obtaining a synthesized image in accordance with an embodiment.

Procedural reconstruction of image 230 may be performed (at least in part) by an inference model trained to take areas of interest 206 as input and generate a synthesized environment. Procedural reconstruction of image 230 may also include generating synthesized image 232 using the areas of interest 206 and the synthesized environment. The synthesized image may depict the areas of interest within the synthesized environment and the synthesized image 232 may be provided to a downstream consumer for further analysis and/or interpretation. Refer to FIG. 3B for additional details regarding obtaining synthesized images.

As discussed above, the components of FIG. 1 may perform various methods to generate synthesized images. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of storing an image in accordance with an embodiment is shown. The method may be performed by an imaging system or another data processing system.

At operation 300, an image is obtained. The image may be obtained by (i) reading the image from storage, (ii) receiving the image from another device, and/or (iii) generating the image (e.g., capturing it) through use of an imaging device such as a camera.

The image may depict a scene. The image may be interpreted through, for example, automated analysis via an inference model or other computer implemented process. The image may depict, for example, a group of cells and/or other human tissues, a manufacturing process, an accident scene, a construction site, and/or any other type of scene for which derived information based on the depicted scene may be desired for various purposes.

In an embodiment, the image is a super resolution image. For example, the image may include large amounts of information and may require gigabytes of storage space for storage.

At operation 302, areas of interest in the image are identified. The areas of interest may be identified (i) by reading them from storage (e.g., if they already exist) and/or (ii) through automated analysis of the image. The automated analysis may be performed with an inference model that may take the image as input and output the areas of interest.

The areas of interest may be part of a hierarchical system that defines some of the areas of interest as being higher or lower in the hierarchy. For example, areas of interest more critical to an outcome of a process through which the areas of interest are identified may be higher in the hierarchy while other areas of interest less critical to the outcome of the process may be lower in the hierarchy. Any number of areas of interest at any level within the hierarchy may be identified for the image.

For example, in the context of a medical image, the process may be a diagnosis of a medical condition. An inference model may review the medical image as part of the diagnosis and may identify the areas of interest, which may be of greater or lesser relevancy to the medical diagnosis. Consequently, if a second subject matter expert (e.g., a medical professional or another inference model) reviews the medical image, it may be likely that the second subject matter expert may only review the identified areas of interest (or only a subset of the areas of interest) to double check or otherwise verify a previously made diagnosis, or use the medical image for other purposes (e.g., research).

At operation 304, the image is segmented into segments. The image segments may be portions of the image. The image segments may be similar or different amounts of the image. At operation 306, the image segments are classified based on the areas of interest to obtain image segment classifications. The image segments may be classified based on their membership in the areas of interest. An image segment may be a member of an area of interest if the image segment includes of a portion of the image that lies within a boundary that defines the area of interest. The memberships in the areas of interest may be used to calculate a value representative of a likelihood of the image segment being accessed in the future. The value may be used to classify the image segment into one of any number of groups (e.g., higher areas of interest, lower areas of interest, etc.) of image segments. The aforementioned process may be repeated for each image segment to classify each of the image segments.

At operation 308, a storage tier allocation for each of the image segments is obtained. The storage tier allocation for each of the image segments may be based on a corresponding image segment classification for the respective image segment. For example, a lookup (or other process) may be performed based on the corresponding image segment classification to identify the storage tier allocation for each image segment. The storage tier allocation may, for example, indicate where an image segment is stored, provide a plan for managing storage of the image segment (e.g., levels of redundancy, migration plans, etc.), a resolution or other information regarding the fidelity of the image segment, and/or may provide other information regarding storage of the image segment. A storage tier allocation for each segment may be obtained.

At operation 310, each of the image segments is stored in a storage of a storage tier based on the corresponding storage tier allocation. The image segments may be stored by providing the image segments to the respective storages and/or instructions to store the image segments in the corresponding storages. The copies of the image segments provided to the storage may be performed to the fidelity levels and/or other information specified in the storage allocation.

For example, the storage tier allocation for image segments that are not associated with areas of interest may indicate that these image segments are to be stored in a reduced resolution format (or at a prescribed level of fidelity). In this manner, both the cost for the storage tier and the quantity of resources of the storage tier used to store an image segment may be scaled based on the relative importance of each image segment.

Additionally, in some embodiments, the storage tier allocation for the image segments may specify a level of redundancy such that, depending on the image segment classifications: (i) lowest fidelity copies of image segments may be stored in archival storage tiers, (ii) lower fidelity copies of the image segments may be stored in lower tiered storage, and/or (iii) full or high fidelity copies of the image segments may be stored in higher tiered storage.

The method may end following operation 310.

Turning to FIG. 3B, a flow diagram illustrating a method of obtaining a synthesized image in accordance with an embodiment is shown. The method may be performed by an imaging system or another data processing system.

At operation 312, areas of interest of an image are obtained. Areas of interest may include regions of an image. The areas of interest may be keyed to various processes and/or services of interest to a downstream consumer. The areas of interest may be obtained (i) by reading them from storage (e.g., if they already exist), (ii) through automated analysis of the image, and/or (iii) by a user (e.g., a medical professional) via obtaining an image and manually designating portions of the image as areas of interest. The automated analysis may be performed with an inference model (e.g., a neural network) that may take the image as input and output the areas of interest. In an embodiment, areas of interest may be obtained from another entity and/or another storage device and transmitted to the imaging system 100 for use in a procedural reconstruction process as described below.

In an embodiment, image segments corresponding to other areas of the image outside of the areas of interest are not read. Consequently, the workload on a storage may be reduced when compared to reading all of the image segments of the image from the storage.

At operation 314, a synthesized environment is obtained. The synthesized environment may be an environment in which the areas of interest may reside and that is palatable to a viewer of the synthesized environment. The synthesized environment may be similar to an environment from which the areas of interest were originally captured in terms of the type of the environment but may not include similar information content (e.g., features included in the image). The synthesized environment may be created by an inference model trained to take areas of interest (and/or other areas of an image) as input and generate a synthesized environment as output. In an embodiment, the synthesized environment may be obtained by another entity and transmitted to the imaging system in order to obtain a synthesized image as described below.

In an embodiment, the synthesized environment is obtained through procedural reconstruction. A procedural reconstruction process may be performed, which may, for example, use libraries of environments. The other portions of the image from which the areas of interest are obtained may be used to identify a similar environment included in the libraries of environments. The areas of interest may be positioned in the matched environment, and the portion of the environment proximate to the areas of interest may be modified to blend the boundary between the areas of interest and the environment such that a viewer may not be distracted by the boundary (or, may not be cognitively impacted by the boundary to an extent that the ability of the viewer to perform their function is impaired).

At operation 316, a synthesized image is obtained. The synthesized image may be obtained using the areas of interest and the synthesized environment and may depict the areas of interest superimposed on (or otherwise situated within) the synthesized environment. Imaging system 100 may generate the synthesized image or may obtain the synthesized image from another entity responsible for generating the synthesized image.

At operation 318, the synthesized image is provided to a downstream consumer. As previously mentioned, the downstream consumer may be a subject matter expert (e.g., a medical professional, another inference model, etc.). Viewing the synthesized image (rather than the areas of interest alone) may provide relevant information in a familiar context for a subject matter expert (e.g., a medical professional) and, therefore, may facilitate interpretation of the areas of interest.

The method may end following operation 318.

Using the methods illustrated in FIGS. 3A-3B, embodiments disclosed herein may provide a system that obtains synthesized images based on areas of interest associated with an image. By doing so, the viewer of the images (e.g., a downstream consumer) may be able to view the areas of interest in a common (e.g., familiar) environment to facilitate interpretation and/or analysis of the areas of interest.

Turning to FIGS. 4A-4F, diagrams illustrating a process of generating a synthesized image in accordance with an embodiment are shown.

Figure 4A:
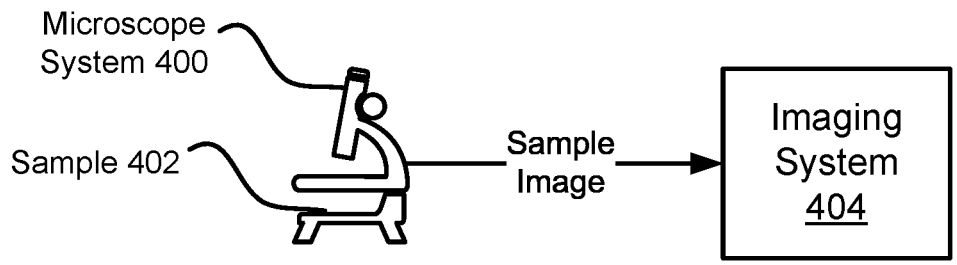
FIGS. 4A-4F show diagrams illustrating a system, operations performed thereby, and data structures used by the system over time in accordance with an embodiment.

Turning to FIG. 4A, consider a scenario in which a medical image of sample 402 useful for medical diagnosis purposes is obtained using microscope system 400, which may include a camera and some number of lenses used to project a depiction of sample 402 on a capture device of the camera. The sample image may be obtained by imaging system 404, which may be similar to the imaging system illustrated in FIG. 1.

Figure 4B:
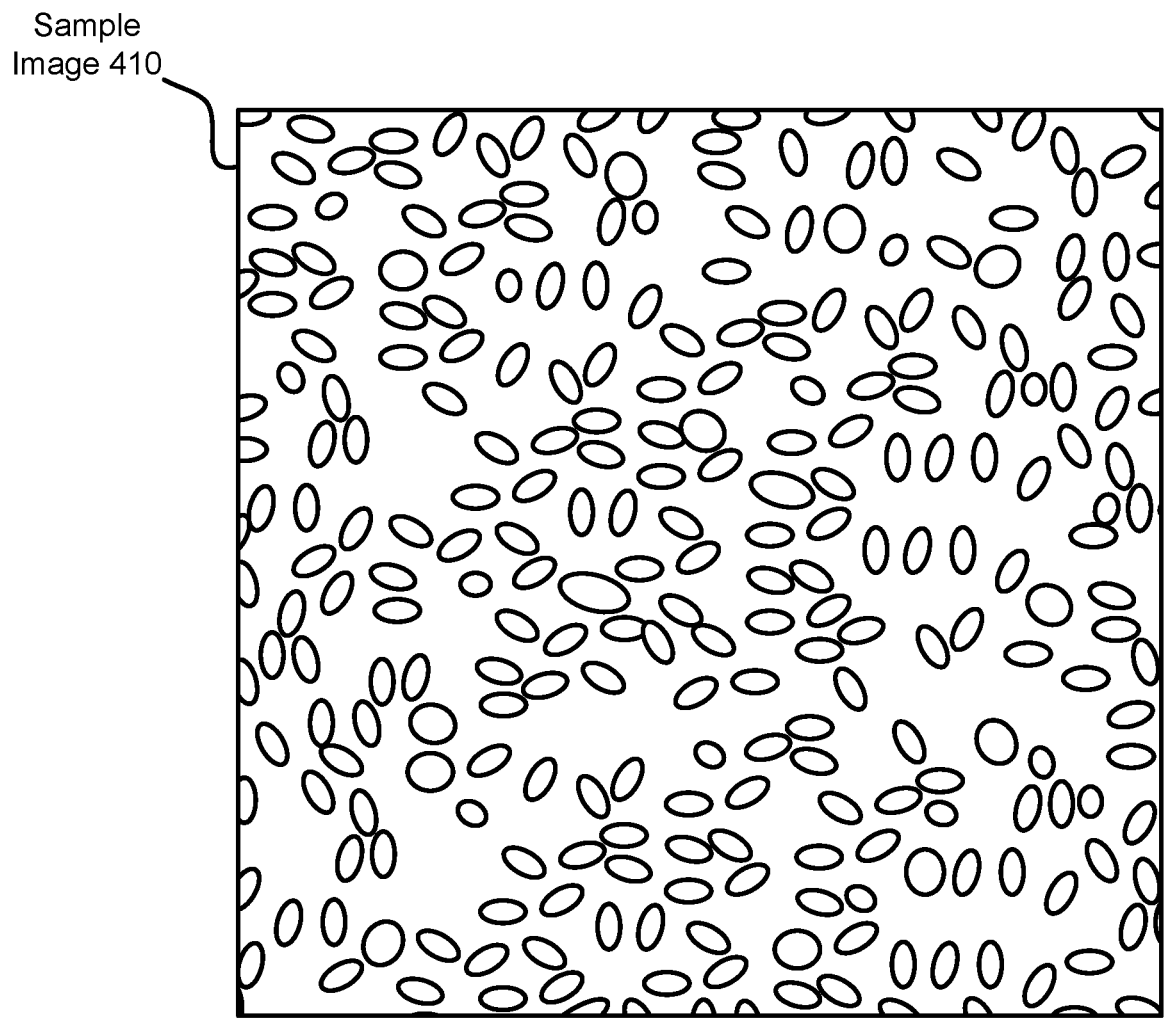

Turning to FIG. 4B, a diagram of sample image 410 in accordance with an embodiment is shown. Sample image 410 may be complex and include many features regarding a scene. For example, sample 402 may be a tissue sample from a person. In FIG. 4B, the circles within the border of sample image 410 may represent portions of the image corresponding to cells, proteins, and/or other portions of the tissue. To perform a medical diagnosis, the content and structure of these cells, proteins, and/or other portions of the tissue may be analyzed by an inference model. As part of that analysis, the inference model may identify a range of areas of interest of the image contributing to a final medical diagnosis. For example, certain formations of cells may indicate the presence of cancer or other illnesses.

Figure 4C:
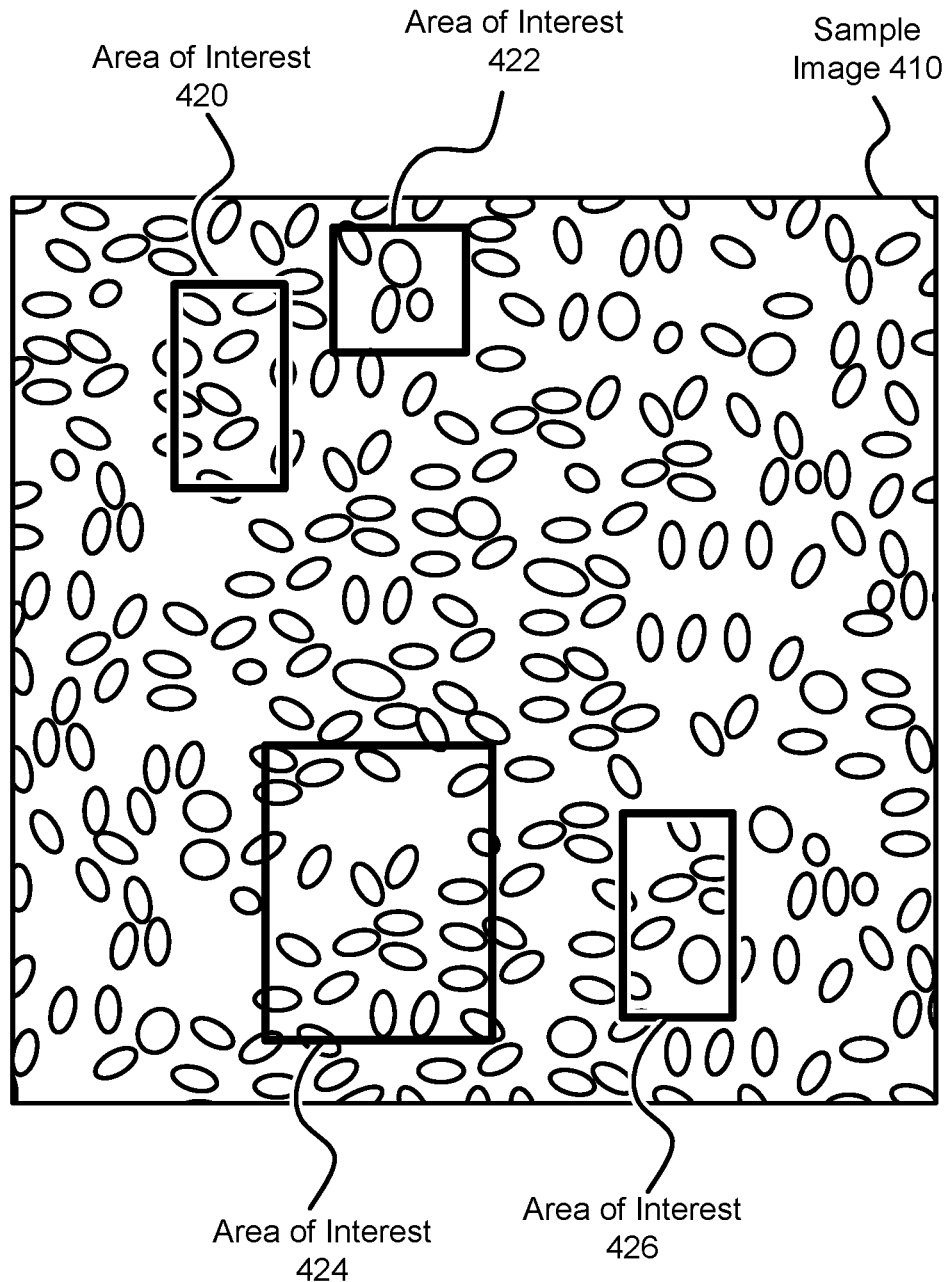

Turning to FIG. 4C, a second diagram of sample image 410 including annotations reflecting areas of interest in accordance with an embodiment is shown. As seen in FIG. 4C, the inference model may identify areas of interest 420-426 within sample image 410. These areas of interest may be explicitly designated by the inference model. In FIG. 4C, the areas of interest are indicated by rectangles with solid borders. As seen, the areas of interest may designate certain portions of the depicted scene (e.g., collections of cells) as being of high relevance to the diagnosis made by the inference model using sample image 410.

Figure 4D:
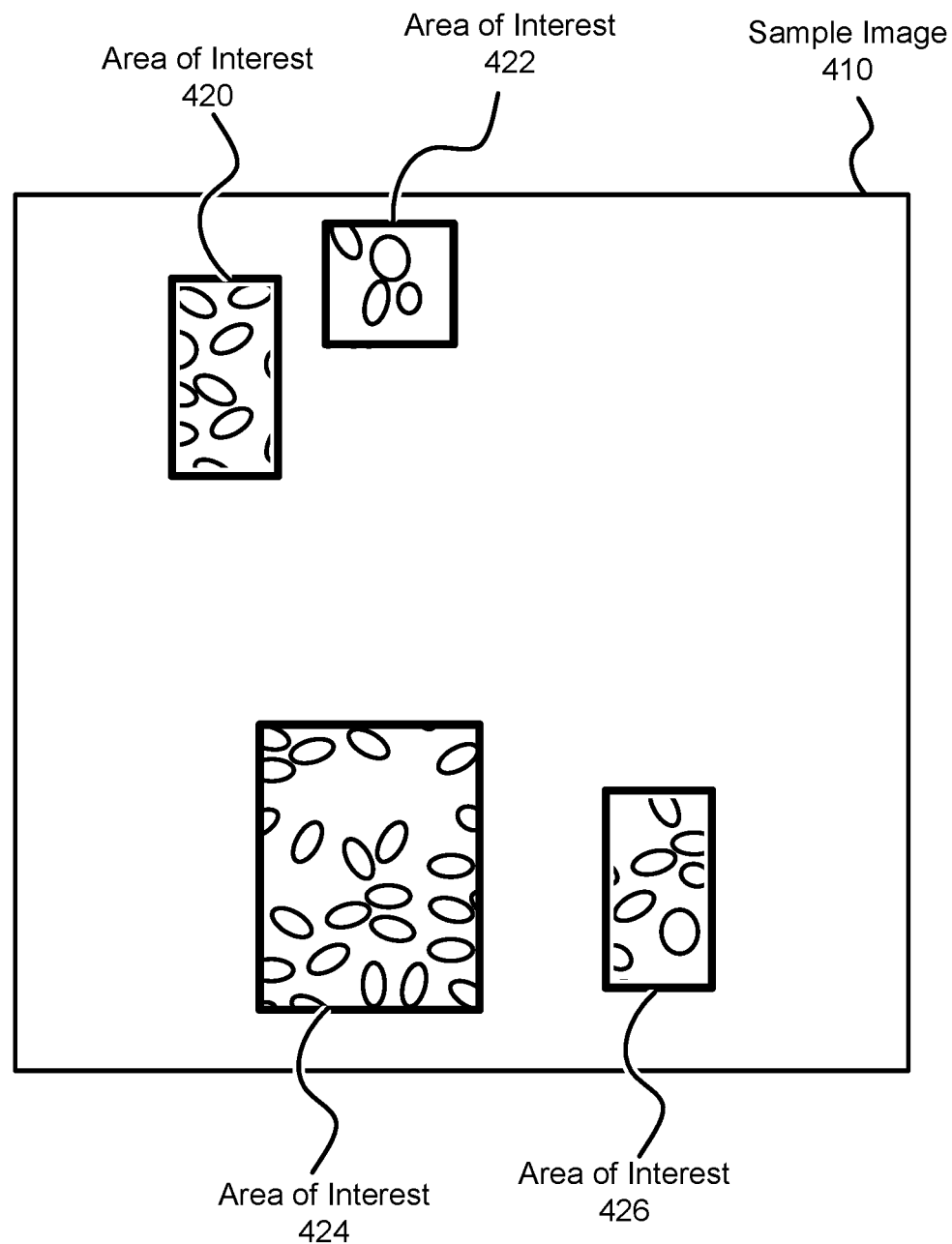

Turning to FIG. 4D, a third diagram of sample image 410 including only the areas of interest 420-426 is shown. As seen in FIG. 4D, only the areas of interest designated by the inference model may be retrieved by a SME (e.g., a medical professional) in order to interpret and/or check the diagnosis provided by the inference model. However, viewing only the areas of interest may distract the SME from being able to contextualize and efficiently interpret the information included in the areas of interest. In order to contextualize the areas of interest, an inference model may generate a synthesized environment in which to display the areas of interest as described below.

Figure 4E:
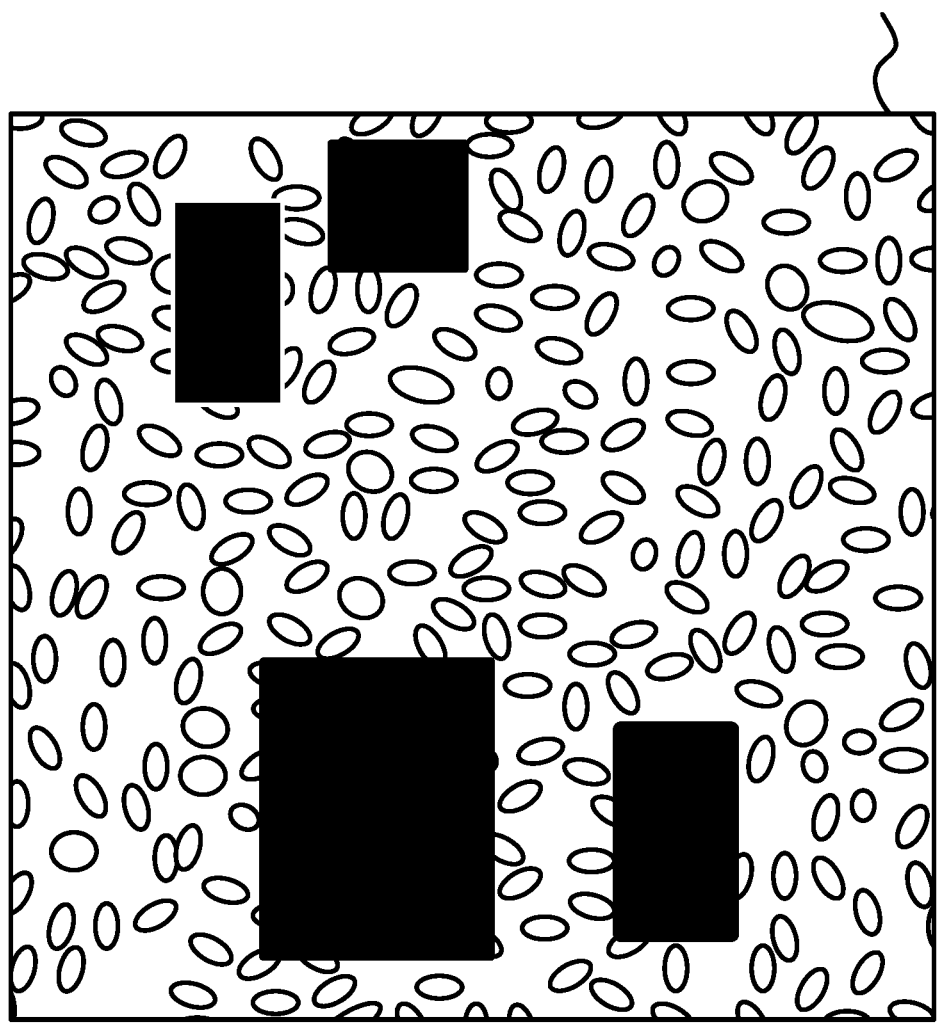

Turning to FIG. 4E, synthesized environment 430 is shown. Synthesized environment 430 may be generated by an inference model trained to take the areas of interest as input and generate a common environment (e.g., an environment in which a SME may expect to see the areas of interest) as output. The inference model may also take other image metadata (e.g., a part of the body depicted in the image, an age of the patient, a weight of patient, a height of the patient, etc.) as input to facilitate generation of the synthesized environment 430. The synthesized environment may depict a scene similar to the scene depicted by sample image 410. Synthesized environment 430 may be obtained via a procedural reconstruction process using inferences generated by the inference model and based on the areas of interest (and/or other input information as previously mentioned). The common environment may include a unique image tailored to the inferences, information obtained from the areas of interest, and/or other input information. As seen in FIG. 4E, solid rectangles are shown in the spaces where the areas of interest may be depicted. The synthesized environment may be less computationally costly to generate than storing the entirety of sample image 410 in high-performance storage for easy access by a user. The portions of sample image 410 not included in the areas of interest may be stored in lower-performance storage, which may limit the speed at which views of the image may be generated through reading these other portions of sample image 410. The synthesized environment 430 and the areas of interest 420-426 may be used to generate a synthesized image as described below.

Figure 4F:
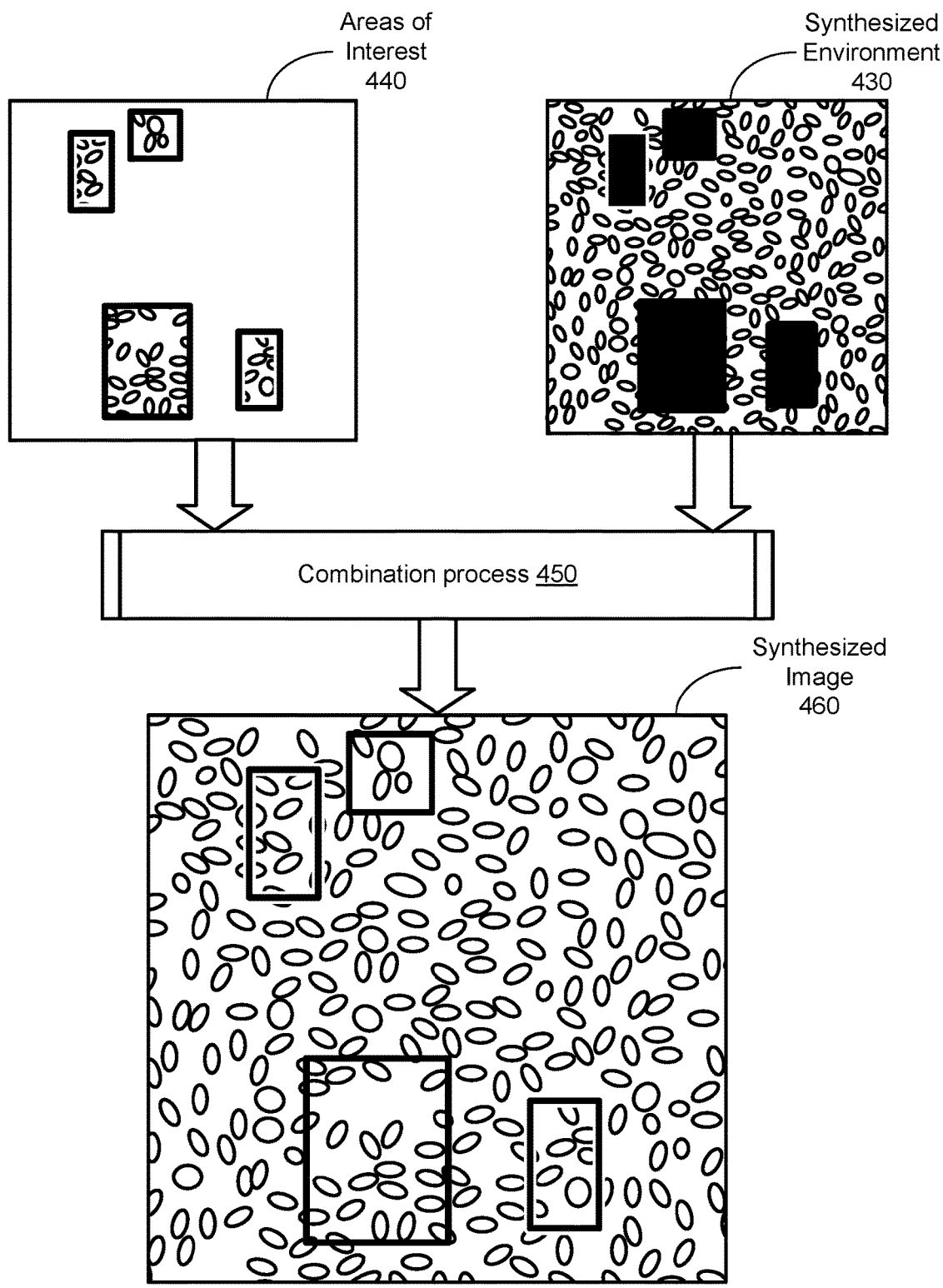

Turning to FIG. 4F, areas of interest 440 and synthesized environment 430 are shown. Areas of interest 440 may represent a depiction of areas of interest 420-426 positioned as they were found in sample image 410. Combination process 450 may include combining areas of interest 440 and synthesized environment 430 in order to display the areas of interest 420-426 in a more familiar environment for interpretation by the SME. Additionally, combination process 450 may include disguising boundaries and/or performing other matching processes to hide boundaries between areas of interest 440 and synthesized environment 430. By doing so, synthesized image 460 may be obtained. As shown in FIG. 4F, synthesized image 460 may include the areas of interest 440 superimposed on synthesized environment 430. Synthesized image 460 may facilitate interpretation of the areas of interest 440 by a medical professional and/or other SME through display of areas of interest that include relevant information content in an environment that facilitates review of the information content without incurring the computational overhead of reading the other portions of sample image 410 from storage.

Embodiments disclosed herein may provide a system that obtains synthesized images using areas of interest in an image. The areas of interest may include portions of an image relevant to an inference generated by an inference model and based on an image. In order to facilitate computer-implemented services using the areas of interest (e.g., a medical expert evaluating a diagnosis based on areas of interest in a tissue biopsy image), an inference model may generate a synthesized environment in which to display the areas of interest of the image to the recipient of the services (e.g., the medical expert). By doing so, the medical expert may more easily interpret and accurately assess the diagnosis made by the inference model without requiring access to the entire image.

Figure 5:
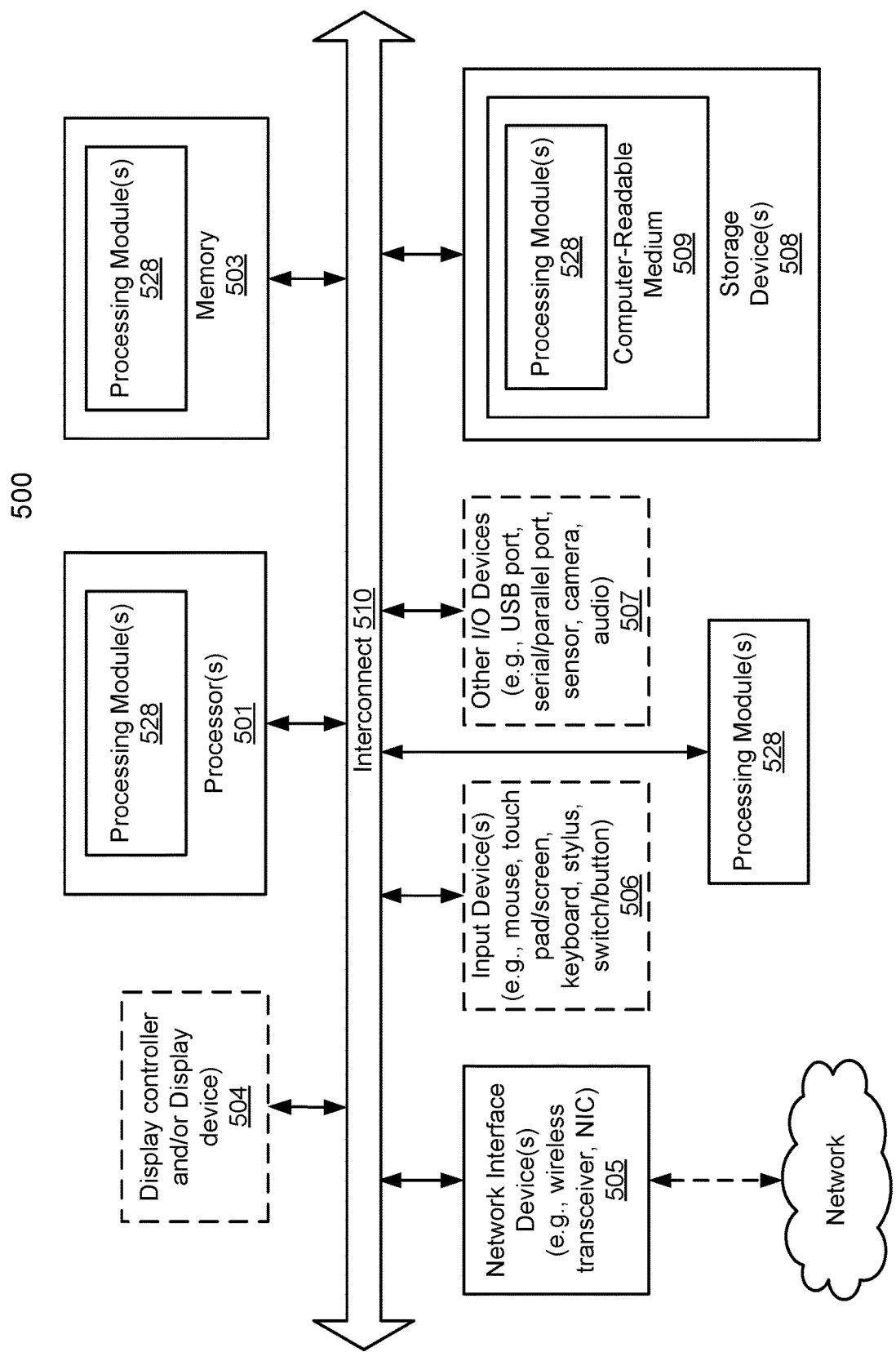
FIG. 5 shows a block diagram illustrating a data processing system in accordance with an embodiment.

Any of the components illustrated in FIGS. 1-4G may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing generation of synthesized images, the method comprising:
 obtaining an area of interest associated with an image, the area of interest indicating a portion of a scene depicted by the image being relevant to a process performed by a downstream consumer, and the portion of the scene being one of multiple portions of the scene depicted by the image;

obtaining a synthesized environment in which the portion of the scene naturally resides from a perspective of the downstream consumer, the synthesized environment depicting a type of scene similar in contextual information to a type of the scene depicted by other portions of the multiple portions of the scene depicted by the image, the contextual information providing the downstream consumer with an understanding of an original version the image without the downstream consumer actually needing to have seen the original version;

obtaining a synthesized image of the synthesized images using the area of interest and the synthesized environment, the synthesized image depicting the area of interest in the synthesized environment to facilitate presentation of the area of interest in a common environment in which the area of interest would be expected to be found by the downstream consumer; and providing the synthesized image to the downstream consumer.

2. The method of claim 1, wherein obtaining the synthesized environment comprises:

performing a procedural reconstruction process to obtain the synthesized environment using the area of interest, the synthesized environment comprising a second image about the area of interest.

3. The method of claim 2, wherein portions of the area of interest adjacent to the second image about the area of interest are matched to disguise a boundary between the area of interest and the second image.

4. The method of claim 3, wherein performing the procedural reconstruction process comprises:

ingesting the area of interest into a trained inference model to obtain the second image as output from the trained inference model.

5. The method of claim 4, wherein performing the procedural reconstruction process further comprises:

ingesting at least a second area of the image into the trained inference model to obtain the output.

6. The method of claim 5, wherein the trained inference model is a trained neural network.

7. The method of claim 1, wherein the portion of the scene is relevant to a medical diagnosis through interpretation of the image, and the other portions of the multiple portions of the scene being irrelevant to the medical diagnosis made using the image.

8. The method of claim 7, wherein the synthesized image presents the area of interest to a subsequent interpreter of the synthesized image in the common environment to facilitate interpretation by the subsequent interpreter without distraction due to a limited extent of the area of interest compared to an extent of the image.

9. The method of claim 1, wherein obtaining the area of interest comprises:

obtaining image segments, at least one of image segments comprising a portion of the area of interest and a portion of the image outside the area of interest; and isolating the portion of the area of interest from the portion of the image outside the area of interest to obtain a portion of the area of interest.

10. A non-transitory machine-readable medium having instructions stored therein, which when executed by a processor, cause the processor to perform operations for managing generation of synthesized images, the operations comprising:

obtaining an area of interest associated with an image, the area of interest indicating a portion of a scene depicted by the image being relevant to a process performed by a downstream consumer, and the portion of the scene being one of multiple portions of the scene depicted by the image;

obtaining a synthesized environment in which the portion of the scene naturally resides from a perspective of the downstream consumer, the synthesized environment depicting a type of scene similar in contextual information to a type of the scene depicted by other portions of the multiple portions of the scene depicted by the image, the contextual information providing the downstream consumer with an understanding of an original version the image without the downstream consumer actually needing to have seen the original version;

obtaining a synthesized image of the synthesized images using the area of interest and the synthesized environment, the synthesized image depicting the area of interest in the synthesized environment to facilitate presentation of the area of interest in a common environment in which the area of interest would be expected to be found by the downstream consumer; and providing the synthesized image to the downstream consumer.

11. The non-transitory machine-readable medium of claim 10, wherein obtaining the synthesized environment comprises:

performing a procedural reconstruction process to obtain the synthesized environment using the area of interest, the synthesized environment comprising a second image about the area of interest.

12. The non-transitory machine-readable medium of claim 11, wherein portions of the area of interest adjacent to the second image about the area of interest are matched to disguise a boundary between the area of interest and the second image.

13. The non-transitory machine-readable medium of claim 12, wherein performing the procedural reconstruction process comprises:

ingesting the area of interest into a trained inference model to obtain the second image as output from the trained inference model.

14. A data processing system, comprising:

a processor; and a memory coupled to the processor to store instructions, which when executed by the processor, cause the processor to perform operations for managing generation of synthesized images, the operations comprising:

obtaining an area of interest associated with an image, the area of interest indicating a portion of a scene depicted by the image being relevant to a process performed by a downstream consumer, and the portion of the scene being one of multiple portions of the scene depicted by the image;

obtaining a synthesized environment in which the portion of the scene naturally resides from a perspective of the downstream consumer, the synthesized environment depicting a type of scene similar in contextual information to a type of the scene depicted by other portions of the multiple portions of the scene depicted by the image, the contextual information providing the downstream consumer with an understanding of an original version the image without the downstream consumer actually needing to have seen the original version;

obtaining a synthesized image of the synthesized images using the area of interest and the synthesized environment, the synthesized image depicting the area of interest in the synthesized environment to facilitate presentation of the area of interest in a common environment in which the area of interest would be expected to be found by the downstream consumer; and providing the synthesized image to the downstream consumer.

15. The data processing system of claim 14, wherein obtaining the synthesized environment comprises:

performing a procedural reconstruction process to obtain the synthesized environment using the area of interest, the synthesized environment comprising a second image about the area of interest.

16. The data processing system of claim 15, wherein portions of the area of interest adjacent to the second image about the area of interest are matched to disguise a boundary between the area of interest and the second image.

17. The data processing system of claim 16, wherein performing the procedural reconstruction process comprises:

ingesting the area of interest into a trained inference model to obtain the second image as output from the trained inference model.

18. The method of claim 1, wherein the synthesized environment comprises a copy of the area of interest in an original form of the area of interest within the image and at an original position of the area of interest within the image, the area of interest being superimposed onto the copy of the area of interest when the area of interest and the synthesized environment are used to obtain the synthesized image.

19. The method of claim 1, wherein an area within the synthesized environment that corresponds to an area at which the area of interest is positioned in the original image is constructed as a placeholder area without an image object, the area of interest being situated within the placeholder area when the area of interest and the synthesized environment are used to obtain the synthesized image.

20. The method of claim 1, wherein a first amount of computing resources, associated with a data processing system, required to generate the synthesized environment is smaller than a second amount of computing resources, associated with the data processing system, required to store an original form of the image in its entirety in the data processing system.

* * * * *